Patented Apr. 9, 1929.

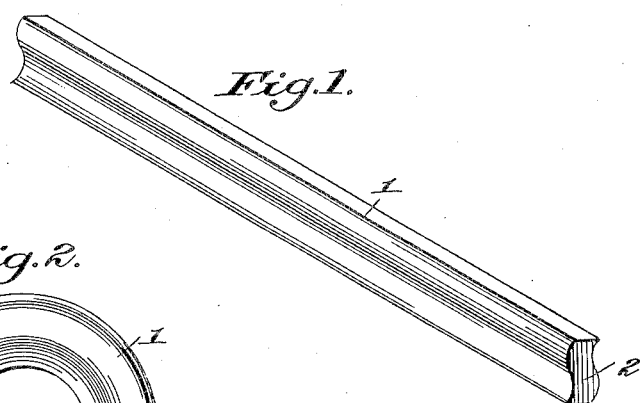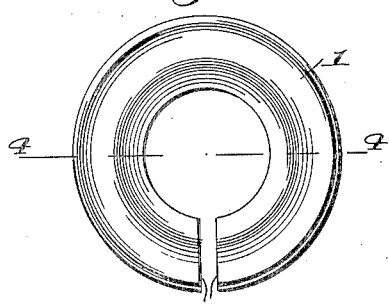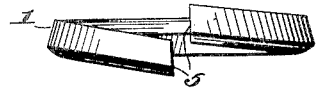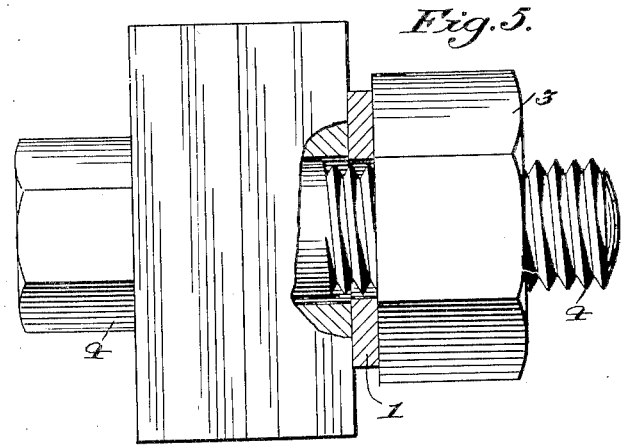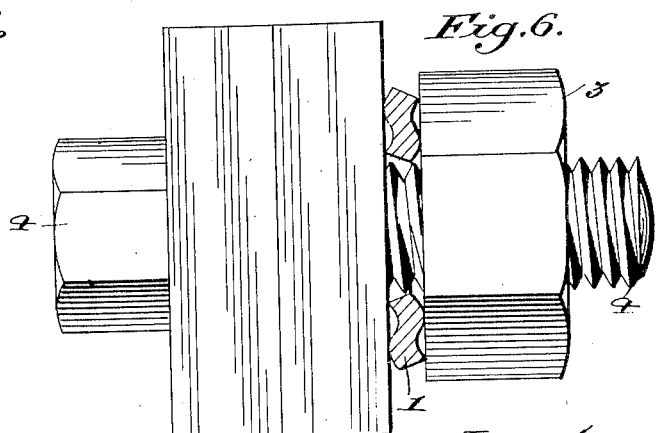

1,708,799

UNITED STATES PATENT OFFICE.

HARRY G. NORWOOD, OF BALTIMORE, MARYLAND.

SPRING NUT-LOCK WASHER.

Application filed September 24, 1927. Serial No. 221,761.

This invention relates to an improved and novel nut lock washer of the split spring type and is so constructed that the resiliency or spring of the washer serves to effectively resist the force of compression and to take up the slack usually caused by stretching the bolt.

The prime object of the invention is to provide a simple, economical, durable and thoroughly efficient spring nut lock washer, adapted to effectively prevent the nut from loosening or unscrewing when subjected to undue strains and vibrations of various kinds.

Another object of the invention is to so construct my improved washer, that it will normally be substantially S-shaped in cross section throughout its entire length, so that when it is formed into an annular washer and compressed tightly down upon the work the washer will expand circumferentially resulting in a slight increase in its diameter.

It is well known in this art that it often occurs when the railway trackmen are applying the securing nuts and bolts to a railway joint the nuts are set too tightly thereby stretching the bolt, thus rendering ineffective the ordinary washer now employed, while with the use of my improved washer, when the bolt stretches under high pressure, the S-shape cross-section of the washer will spring back to its normal shape, taking up all slack, and holding the nut firmly at any position it may be resting.

The foregoing and such other objects as may appear from the ensuing description are attained by the construction, arrangement and location of my improved washer hereinafter more fully described, illustrating by the accompanying drawings, and particularly pointed out in the claims appended hereto, it being understood that slight changes in the precise shape, proportion and minor details of construction may be resorted to without departing from the spirit or sacrificing any of the advantages of the invention.

In the accompanying drawings forming a part of this specification it will be seen that:—

Figure 1 is a perspective view showing a bar of spring steel from which the washer embodying my invention is formed.

Figure 2 is a plan showing the washer embodying my invention ready for use.

Figure 3 is a side elevation of the same.

Figure 4 is a transverse section taken in the plan of the dotted lines 4—4, Fig. 2.

Figure 5 is a part elevation and partly in section showing the washer compressed into a flat condition, and Figure 6 is a part elevation and partly in section showing the bolt in a slightly stretched condition with the washer in its normal shape.

In the embodiment of my invention as illustrated it will be seen that in Fig. 1 the numeral 1 designates a bar of suitable dimensions formed from high carbon tool steel, hot rolled, or cold drawn and from which my novel washer is formed on a mandrel and cut into the form, such as shown in Figures 2, 3 and 4.

It will be perceived that the bar 1 is formed into an S-shape entirely throughout its length, so that when bent into annular form for use, it will be in S-shape transversely, as already shown at 2, in Fig. 4, at any and all points in its formation. This normal S-section formation, when tempered properly, will tend to spring back to its normal shape after it has been compressed by a nut 3, as shown in Fig. 5. In the event that the bolt 4 stretches under high pressure, which often happens at the time the nut is tightened against an object, the S-shape cross-section of the washer will spring back to its former or normal shape, and assume the condition such as is shown in Fig. 6, thus taking up all slack and securing the nut firmly at any position it may rest.

By reference to Fig. 3, it will be seen that the edge view illustrates the split portions 5 of the washer at opposite angles, said portions being compressed together in a flattened condition when under pressure, and when the washer is compressed completely by setting the nut tightly against it, the said washer will become flattened and expand circumferentially, as shown in Fig. 5, thereby resulting in a slight increase in its diameter, and will contract when relieved of high pressure and assume its normal S-shape formation in cross-section.

It will be readily obvious that this particular shape and formation of washer can be cold-punched, hot-punched or forged, or otherwise formed in any suitable or desirable manner.

Having thus described my invention, what I claim and desire to secure by Letters Patent is:

1. A spring nut lock washer formed from a bar of spring steel having an S-shape in transverse cross section throughout its entire length with its adjacent end portions bent in opposite directions.

2. A spring nut lock washer formed from a bar of suitable steel, and bent into an annular form with the adjacent end portions bent in opposite directions, said washer being S-shape in transverse cross-section at all points thereof.

3. A split spring nut lock washer of spiral form with an S-shape formation in transverse cross-section throughout its entire formation and with its adjacent end portions bent in opposite directions.

4. A spring nut lock washer provided with a transverse S-shape cross sectional formation throughout its entire body and with its adjacent end portions bent in opposite directions, said washer being adapted to expand circumferentially when under high pressure, and to contract when the high pressure is relieved.

HARRY G. NORWOOD.